United States Patent
Rhodes et al.

(10) Patent No.: US 11,975,622 B2
(45) Date of Patent: May 7, 2024

(54) CHARGING INLET ASSEMBLY HAVING AN AC CHARGING MODULE

(71) Applicant: TE Connectivity Services GmbH, Schaffhausen (CH)

(72) Inventors: Clara Marguerite Rhodes, Winston Salem, NC (US); Hurley Chester Moll, Hershey, PA (US); Matthew Bryan Hitchcock, Hershey, PA (US); Aaron James de Chazal, Rochester, MI (US); Kevin John Peterson, Kernersville, NC (US)

(73) Assignee: TE Connectivity Solutions GmbH (CH)

( * ) Notice: Subject to any disclaimer, the term of this patent is extended or adjusted under 35 U.S.C. 154(b) by 480 days.

(21) Appl. No.: 17/229,936

(22) Filed: Apr. 14, 2021

(65) Prior Publication Data
US 2022/0332198 A1    Oct. 20, 2022

(51) Int. Cl.
| | |
|---|---|
| *B60L 53/16* | (2019.01) |
| *B60L 53/18* | (2019.01) |
| *H01R 13/24* | (2006.01) |
| *H01R 13/447* | (2006.01) |
| *H01R 13/627* | (2006.01) |
| *H01R 103/00* | (2006.01) |

(52) U.S. Cl.
CPC .............. *B60L 53/16* (2019.02); *B60L 53/18* (2019.02); *H01R 13/2492* (2013.01); *H01R 13/447* (2013.01); *H01R 13/6271* (2013.01); *H01R 2103/00* (2013.01)

(58) Field of Classification Search
CPC .......... B60L 53/16; B60L 53/18; B60L 53/31; H01R 13/2492; H01R 13/447; H01R 13/6271; H01R 2103/00; H01R 13/506; H01R 13/516; H01R 13/502; H01R 13/02; H01R 13/514; H01R 13/648; H01R 13/665; Y02T 10/70; Y02T 10/7072; Y02T 90/14
See application file for complete search history.

(56) References Cited

U.S. PATENT DOCUMENTS

| | | | |
|---|---|---|---|
| 2019/0020140 A1* | 1/2019 | Fuehrer | ................ H01R 13/04 |
| 2020/0384875 A1* | 12/2020 | Rhodes | ................ B60L 53/11 |

FOREIGN PATENT DOCUMENTS

DE    102019209961 A1 *    1/2021    .............. B60L 53/14

* cited by examiner

*Primary Examiner* — Nghia M Doan

(57) ABSTRACT

A charging inlet assembly includes a housing extending between a front and a rear. The housing has a DC section including DC terminal channels that are configured to receive DC terminals. The housing has an AC section including an AC module chamber. The DC section is configured for mating with a DC charging connector at the front. The AC section is configured for mating with an AC charging connector at the front. The charging inlet assembly includes an AC charging module removably received in the AC module chamber. The AC charging module includes an AC insert extending between an insert front and an insert rear. The AC insert includes AC terminal channels between the insert front and the insert rear. The AC charging module include AC terminals received in the AC terminal channels. The AC terminals are terminated to ends of AC cables extending from the insert rear. The AC terminals and the AC cables are removable from the housing with the AC insert.

19 Claims, 14 Drawing Sheets

CHARGING INLET ASSEMBLY HAVING AN AC CHARGING MODULE

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. When components of the charging inlet assembly are worn or damaged, the charging inlet assembly is typically removed and either repaired or replaced. Removal of the charging inlet assembly is time consuming, leading to costly repairs.

A need remains for an improved charging inlet assembly.

BRIEF DESCRIPTION OF THE INVENTION

In one embodiment, a charging inlet assembly is provided. The charging inlet assembly includes a housing extending between a front and a rear. The housing has a DC section including DC terminal channels that are configured to receive DC terminals. The housing has an AC section including an AC module chamber. The DC section is configured for mating with a DC charging connector at the front. The AC section is configured for mating with an AC charging connector at the front. The charging inlet assembly includes an AC charging module removably received in the AC module chamber. The AC charging module includes an AC insert extending between an insert front and an insert rear. The AC insert includes AC terminal channels between the insert front and the insert rear. The AC charging module include AC terminals received in the AC terminal channels. The AC terminals are terminated to ends of AC cables extending from the insert rear. The AC terminals and the AC cables are removable from the housing with the AC insert.

In another embodiment, a charging inlet assembly is provided. The charging inlet assembly includes a housing extending between a front and a rear. The housing has a DC section including DC terminal channels configured to receive DC terminals. The housing has an AC section including an AC module chamber. The housing includes a latching feature at the AC section. The DC section is configured for mating with a DC charging connector at the front. The AC section is configured for mating with an AC charging connector at the front. The charging inlet assembly includes an AC charging module removably received in the AC module chamber. The AC charging module includes an AC insert extending between an insert front and an insert rear. The AC insert includes an insert latching feature latchably coupled to the latching feature of the housing to secure the AC insert in the housing. The AC insert includes a rear cavity at the insert rear. The AC insert includes AC terminal channels extending forward from the rear cavity to the insert front. The AC charging module includes AC terminals. Each AC terminal extends between a mating end and a cable end. The mating end is received in the corresponding AC terminal channel. The cable end is terminated to an end of a corresponding AC cable. The AC charging module includes a rear cover assembly coupled to the insert rear. The AC cables extends through the rear cover assembly. The AC terminals and the AC cables are removable from the housing with the AC insert.

In a further embodiment, an AC charging module is provided. The AC charging module includes an AC insert extending between an insert front and an insert rear. The AC insert includes an insert latching feature configured to be latchably coupled to a latching feature of a charging inlet housing to secure the AC insert in the charging inlet housing. The AC insert includes a rear cavity at the insert rear. The AC insert includes AC terminal channels extending forward from the rear cavity to the insert front. The AC charging module includes AC terminals received in corresponding AC terminal channels. Each AC terminal extends between a mating end and a cable end. The AC terminal includes a mating pin at the mating end. The mating pin is received in the corresponding AC terminal channel for mating with an AC charging contact of an AC charging connector. The cable end is terminated to an end of an AC cable. The AC terminal includes a terminal seal received in the AC terminal channel to seal between the AC terminal and the AC insert. The AC charging module includes a PCB assembly received in the rear cavity. The PCB assembly includes a circuit board. The PCB assembly includes a low-voltage contact coupled to the circuit board and extends through the insert housing for mating with a low-voltage contact of the AC charging connector. The PCB assembly includes a rear cover assembly coupled to the insert rear of the AC insert. The rear cover assembly closes the PCB assembly and the AC terminals in the AC insert. The AC cables extend through the rear cover assembly. The AC terminals and the AC cables are configured to be removed from the charging inlet housing with the AC insert.

DETAILED DESCRIPTION OF THE INVENTION

Figure 1:
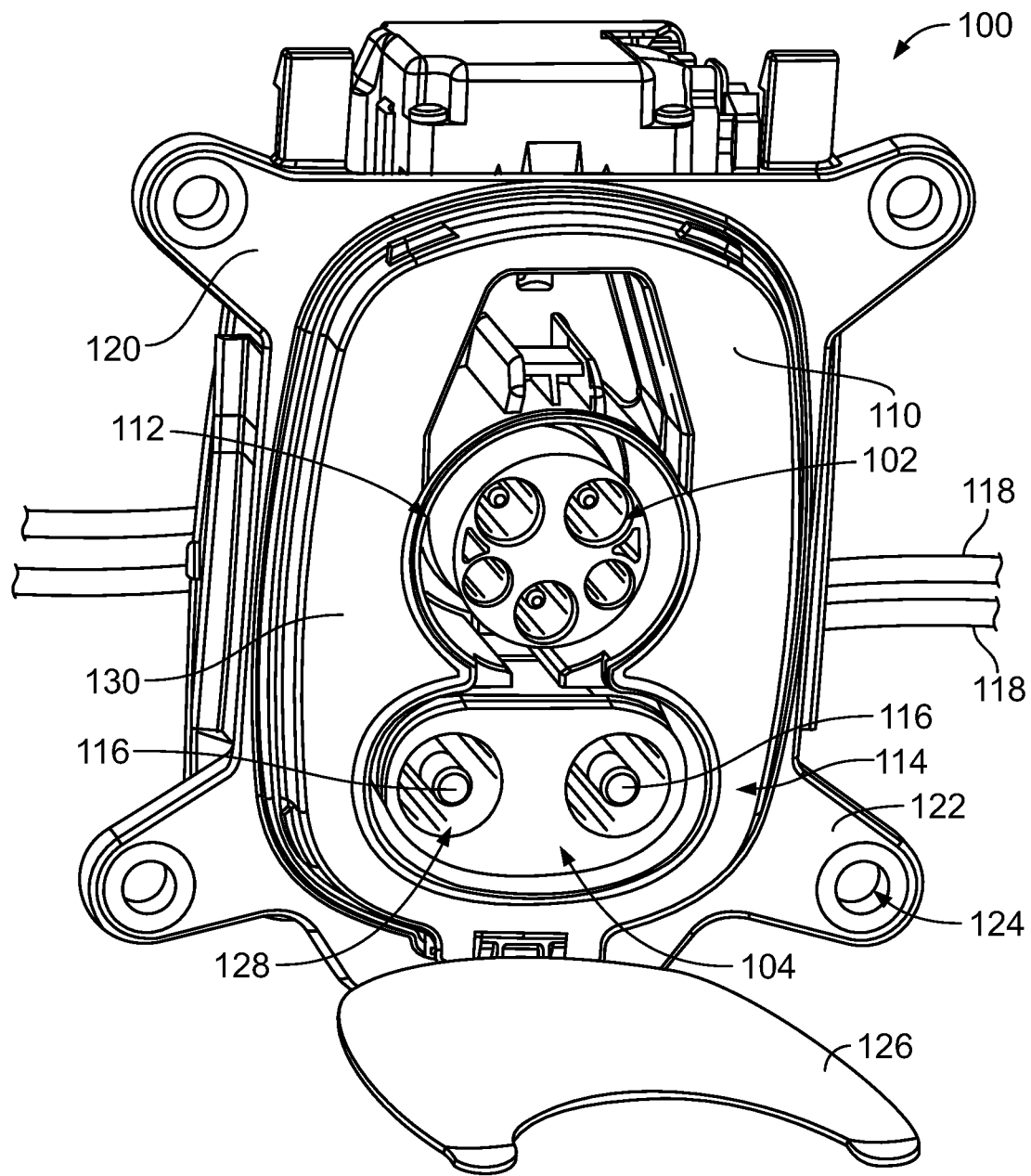
FIG. 1 is a front perspective view of a charging inlet assembly including an AC charging module in accordance with an exemplary embodiment.
Figure 2:
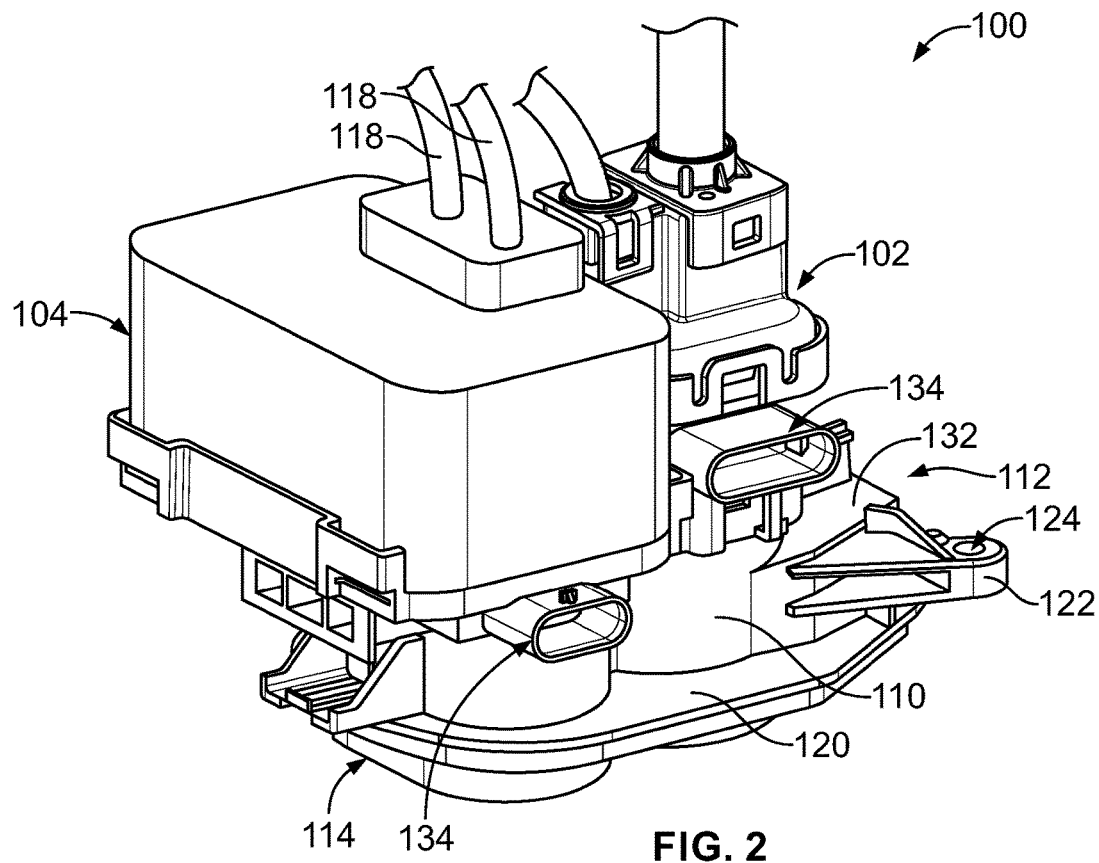
FIG. 2 is a perspective view of the charging inlet assembly showing the AC charging module in accordance with an exemplary embodiment.
Figure 3:
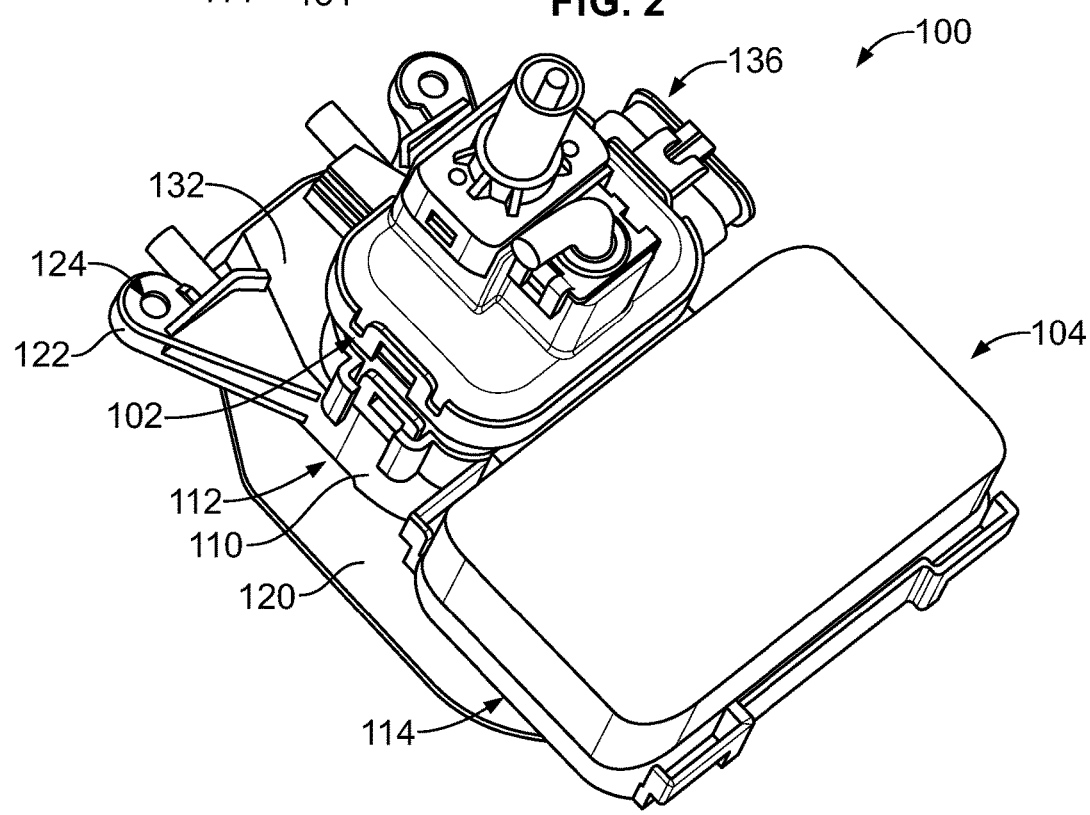
FIG. 3 is a rear perspective view of the charging inlet assembly showing the AC charging module in accordance with an exemplary embodiment.

FIG. 1 is a front perspective view of a charging inlet assembly 100 including an AC charging module 102 in accordance with an exemplary embodiment. FIG. 2 is a perspective view of the charging inlet assembly 100 showing the AC charging module 102 in accordance with an exemplary embodiment. FIG. 3 is a rear perspective view of the charging inlet assembly 100 showing the AC charging module 102 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 for mating with the charging connector. The AC charging module 102 is removable from the housing 110. For example, the AC charging module 102 may be latchably coupled to the housing 110 and removable from the housing 110 to separate components of the AC charging module 102 (for example, charging pins, cables, circuit boards, and the like) from the housing 110, such as for repair and/or replacement of the AC charging module components or other components of the charging inlet assembly 100, such as DC charging components or the housing itself. In an exemplary embodiment, the housing 110 additionally holds a DC charging module 104 for mating with the charging connector. In other various embodiments, the housing 110 holds DC components rather than a separate DC charging module that is removable from the housing 110.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The charging inlet assembly 100 includes DC terminals 116 at the DC section 114. DC cables 118 are terminated to the DC terminals 116 and extend from the charging inlet assembly 100 to another component of the vehicle, such as the battery system of the vehicle. The DC terminals 116 are configured to be mated to the charging connector. In an exemplary embodiment, the DC terminals 116 are part of the DC charging module 104. Alternatively, the DC terminals 116 may be directly held by the housing 110. In the illustrated embodiment, the AC section 112 is located above the DC section 114; however, other orientations may be possible in alternative embodiments.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

In an exemplary embodiment, the charging inlet assembly 100 includes a terminal cover 126 (FIG. 1) at a front 130 of the housing 110. The terminal cover 126 is hingedly coupled to the mounting flange 120 and/or the housing 110. The terminal cover 126 is used to cover portions of the housing 110, such as the DC section 114 and/or the AC section 112. The terminal cover 126 may be used to cover the DC terminals 116, which are received in DC terminal channels 128 of the housing 110. The housing 110 may include one or more rear covers at a rear 132 of the housing 110 that closes access to the rear 132 of the housing 110. The rear cover(s) may be clipped or latched onto the main part of the housing 110, such as using clips or latches. Other types of securing features, such as fasteners may be used in alternative embodiments.

In an exemplary embodiment, the charging inlet assembly 100 includes one or more low-voltage connectors 134 (FIG. 2) configured to be coupled to corresponding low-voltage mating connectors 136 (FIG. 3). The low-voltage mating connectors 136 are configured to be coupled to other components in the system, such as a battery distribution unit, to control charging of the vehicle. The low-voltage connectors 134 may transmit/receive signals relating to charging, such as status of connection, status of charge, voltage of charge, and the like. The low-voltage mating connectors 136 may be plug connectors and the low-voltage connectors 134 may be socket connectors, or vice versa. Seals may be provided at the interface between the low-voltage mating connectors 136 and the low-voltage connectors 134. In the illustrated embodiment, the AC charging module 102 includes one of the low-voltage connectors 134. The housing 110 may additionally or alternatively, include one or more of the low-voltage connectors 134.

Figure 4:
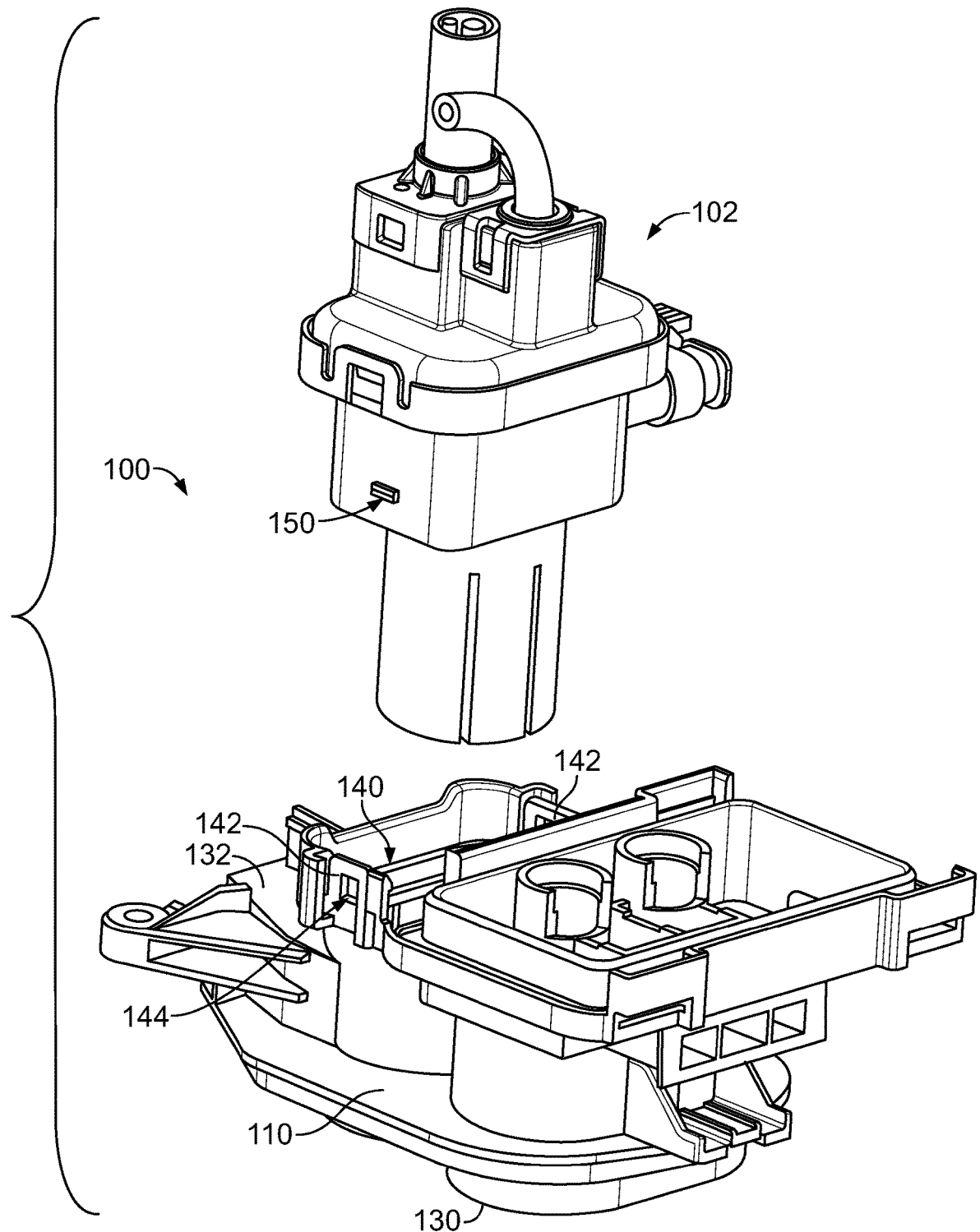
FIG. 4 is a rear perspective view of a portion of the charging inlet assembly showing the AC charging module configured for mating with a housing in accordance with an exemplary embodiment.

FIG. 4 is a rear perspective view of a portion of the charging inlet assembly 100 showing the AC charging module 102 configured for mating with the housing 110 in accordance with an exemplary embodiment. The AC charging module 102 is configured to be coupled to and uncoupled from the housing 110. For example, latching features may be provided to latchably couple the AC charging module 102 to the housing 110. The AC charging module 102 is removable from the housing 110 to separate the charging pins, cables, and other components of the AC charging module 102 from the housing 110 to repair and/or replacement the AC charging module components or to allow removal of the housing 110 from the vehicle without removing the AC charging module 102 and corresponding cable harness from the vehicle.

In an exemplary embodiment, the AC charging module 102 is configured to be loaded into an AC module chamber 140 at the rear 132 of the housing 110, such as through the rear 132 of the housing 110. The AC module chamber 140 is sized and shaped to receive the AC charging module 102. For example, the AC module chamber 140 may be generally rectangular shaped in various embodiments. Optionally, the AC module chamber 140 may extend entirely through the housing 110 to allow access to the AC charging module 102 from the front 130 of the housing 110, such as for mating with the charging connector. In an exemplary embodiment, the housing 110 includes latching features 142 configured to be latchably coupled to the AC charging module 102. For example, the latching features 142 may be deflectable latches having openings 144 that receive corresponding latching features 150 of the AC charging module 102. The latching features 142 may be released from the AC charging module 102 to allow removal of the AC charging module 102 from the housing 110. In an exemplary embodiment, a housing seal (not shown) may be provided in the AC module chamber 140. The housing seal may provide a seal between the housing 110 in the AC charging module 102. The housing seal may be a perimeter seal in various embodiments.

Figure 5:
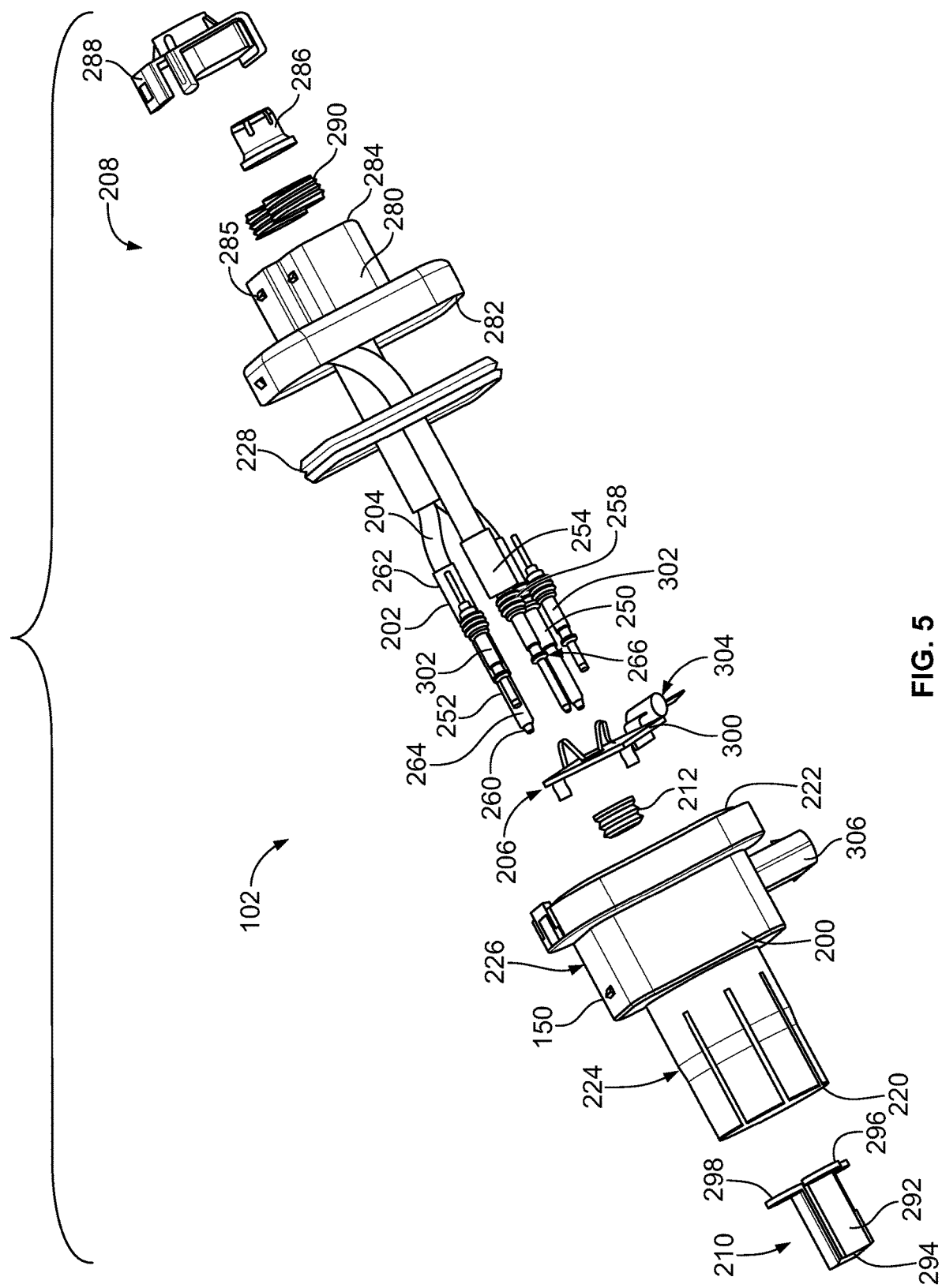
FIG. 5 is an exploded view of the AC charging module in accordance with an exemplary embodiment.

FIG. 5 is an exploded view of the AC charging module 102 in accordance with an exemplary embodiment. The AC charging module 102 includes an AC insert 200 used to hold a plurality of AC terminals 202. The AC terminals 202 are terminated to ends of AC cables 204. In an exemplary embodiment, the AC charging module 102 includes a PCB assembly 206 received in the AC insert 200. The AC charging module 102 includes a rear cover assembly 208 coupled to the rear of the AC insert 200 to enclose the PCB assembly 206 and the AC terminals 200. In an exemplary embodiment, the AC charging module 102 includes a terminal decision assurance (TPA) device 210 used to ensure that the AC terminals 202 are properly located in the AC insert 200. The AC charging module 102 includes an insert seal 212 configured be received in the AC insert 200 to provide internal sealing within the AC insert 200. For example, the insert seal 212 may seal an opening that receives the TPA device 210.

The AC insert 200 is used to house the various components of the AC charging module 102. In an exemplary embodiment, the AC insert 200 is manufactured from a dielectric material, such as a plastic material. In various embodiments, the AC insert 200 is a molded part, such as being formed from an injection molding process. The AC insert 200 extends between an insert front 220 and an insert rear 222. The AC insert 200 includes a front portion 224 extending to the insert front 220 and a rear portion 226 extending to the insert rear 222. The front portion 224 is configured be received in the front end of the housing 110 (shown in FIG. 1) for mating with the charging connector. The rear portion 226 includes the latching features 150 for securing the AC insert 200 to the housing 110. The latching features 150 may be protrusions that form catch surfaces for the deflectable latching features 142 of the housing 110. The AC terminals 202 are loaded through the rear portion 226 into the front portion 224 for mating with the charging connector. In the illustrated embodiment, the front portion 224 is generally cylindrical shaped and the rear portion 226 is generally box shaped. However, the front portion 224 and/or the rear portion 226 may have other shapes in alternative embodiments.

In an exemplary embodiment, the AC charging module 102 includes a cover seal 228 configured be positioned between the AC insert 200 and the rear cover assembly 208. The cover seal 228 provide a seal interface between the AC insert 200 and the rear cover assembly 208.

The PCB assembly 206 is received in the rear portion 226. The rear cover assembly 208 is coupled to the rear portion 226. In an exemplary embodiment, the PCB assembly 206 includes a circuit board 300, one or more low-voltage contacts 302 configured to be coupled to the circuit board 300, and a low-voltage connector 304 coupled to the circuit board 300. The low-voltage contacts 302 are electrically connected to the low-voltage connector 304 through the circuit board 300. In the illustrated embodiment, the low-voltage contacts 302 are pin contacts configured to extend into the front portion 224 for mating with the charging connector. The low-voltage contacts 302 may be proximity contacts, pilot contacts, or other types of contacts. The low-voltage connector 304 is configured to be aligned with a low-voltage connector shroud 306 of the AC insert 200 to define the low-voltage connector 134 of the AC charging module 102. A portion of the low-voltage connector 304 may extend into the low-voltage connector shroud 306. The low-voltage mating connector 136 (shown in FIG. 3) is configured to be coupled to the low-voltage connector shroud 306 to mate with the low-voltage connector 304. For example, a portion of the low-voltage mating connector 136 may be plugged into the low-voltage connector shroud 306 to mate with the low-voltage connector 304.

In the illustrated embodiment, three AC terminals 202 are provided including a line terminal 250, a neutral terminal 252, and a ground terminal 254. Greater or fewer AC terminals 202 may be provided in alternative embodiments. Other types of AC terminals 202 may be provided in alternative embodiments. The AC terminals 202 are electrically connected to corresponding line, neutral, and ground cables of the AC cables 204. Each AC terminal 202 is electrically conductive. For example, the AC terminal 202 may be manufactured from a metal material, such as a copper material. In an exemplary embodiment, the AC terminal 202 is generally cylindrical. The AC terminal 202 may be screw machined. In an exemplary embodiment, the AC terminal 202 includes a terminal seal 258 along the body of the AC terminal 202. The terminal seal 258 is configured to be sealed to the AC insert 200 to provide a sealed interface through the AC charging module 102.

In an exemplary embodiment, each AC terminal 202 extends between a mating end 260 and a cable end 262. The AC terminal 202 includes a pin 264 at the mating end 260. The pin 264 is received in the front portion 224 of the AC insert 200 for mating with the charging connector. In an exemplary embodiment, the pin 264 includes a latching feature 266 along the pin 264 configured to interface with a latch of the AC insert 200 to secure the AC terminal 202 in the AC insert 200. In the illustrated embodiment, the AC terminal 202 includes a crimp barrel at the cable end 262 configured to be crimped to the corresponding AC cable 204. Other types of terminating features may be provided in alternative embodiments, such as weld pads.

The rear cover assembly 208 includes a rear cover 280 extending between a front 282 and a rear 284. In an exemplary embodiment, the rear cover 280 includes cover latching features 285 configured to be coupled to the AC insert 200. The cover latching features 285 may include protrusions having a catch surface configured to be latchably coupled to the AC insert 200. Other types of latching or securing features may be provided in alternative embodiments. The AC cables 204 pass through the rear cover 280. For example, the rear cover 280 may include cable channels that receive the AC cables 204. The rear cover assembly 208 includes strain relief members 286 configured to be coupled to corresponding AC cables 204. The strain relief members 286 provide strain relief for the AC cables 204. In the illustrated embodiment, the strain relief members 286 are cylindrical collets configured to be coupled to the AC cables 204. The rear cover assembly 208 includes cable covers 288 that receive the strain relief members 286. The cable covers 288 are configured to be coupled to the rear 284 of the rear cover 280. Optionally, the cable covers 288 may be clipped or latched to the rear cover 280. The AC cables 204 exit the rear cover assembly 208 through the cable cover 288. In an exemplary embodiment, the rear cover assembly 208 includes cable seals 290 configured be received in the rear cover 280. The cable seals 290 provide sealed interfaces between the AC cables 204 and the rear cover 280.

The TPA device 210 is configured be received in the front portion 224 of the AC insert 200. The TPA device 210 includes a hub 292 extending between a front 294 and a rear 296. The hub 292 is configured be positioned between the pins 264 of the AC terminals 202. The TPA device 210 includes a plate 298 at the rear 296. The plate 298 is configured to interface with the latching features of the AC insert 200 when the AC terminals 202 are loaded and latched in the AC insert 200. The plate 298 interfaces with the latching features of the AC insert 200 to provide terminal position assurance after assembly. For example, the TPA device 210 may be fully loaded into the AC insert 200 when the latching features of the AC insert 200 are properly positioned in latched to the latching features 266 of the AC terminals 202. However, if the latching features of the AC insert are improperly positioned, such as deflected outward because the AC terminals 202 are not fully loaded in latched, the plate 298 may interfere with the latching features restricting the TPA device 210 from being fully loaded into the AC insert 200. The TPA device 210 provides a visual indication that the AC terminals 202 are not fully loaded in latched in the AC insert 200.

Figure 6:
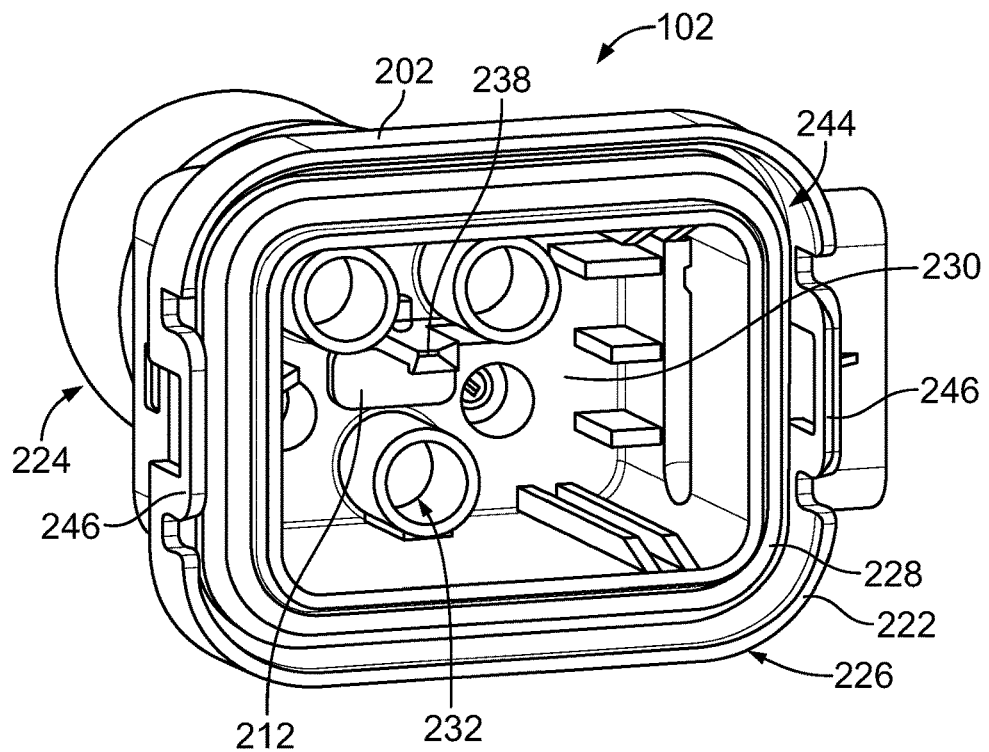
FIG. 6 is a rear perspective view of a portion of the AC charging module in accordance with an exemplary embodiment showing an AC insert.
Figure 7:
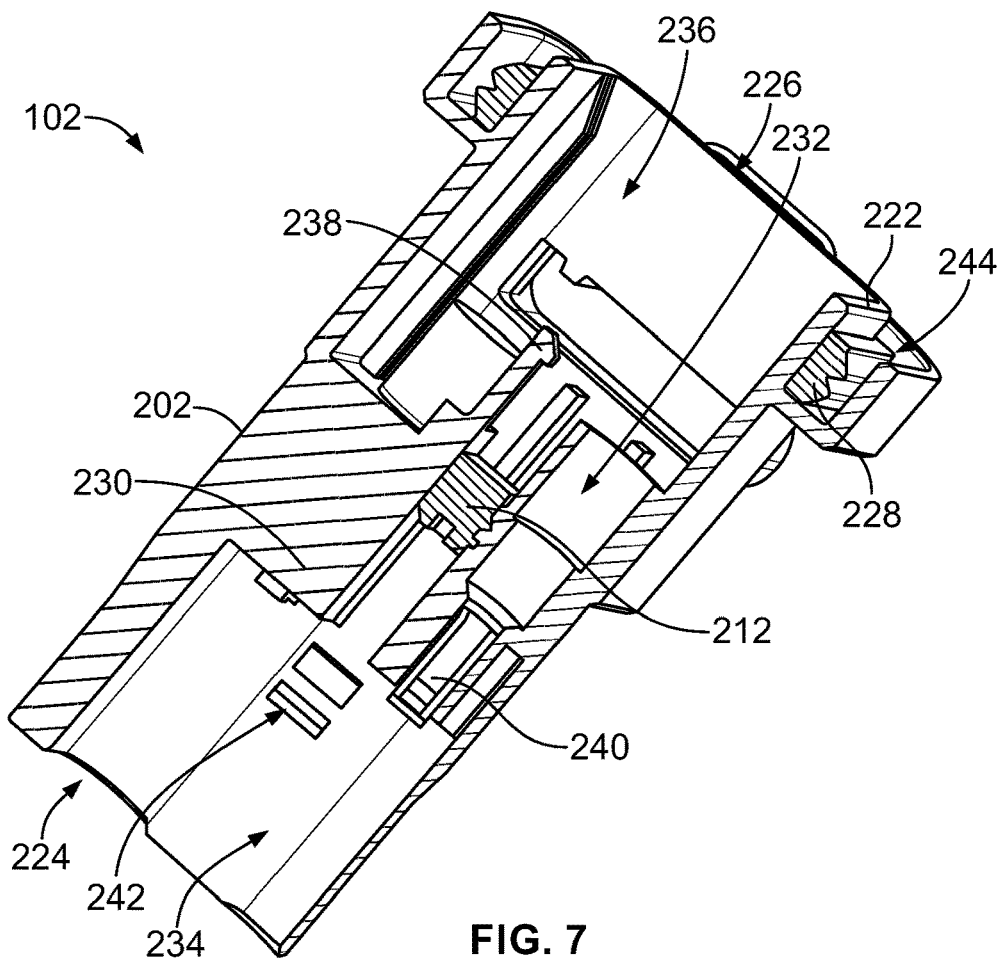
FIG. 7 is a cross-sectional view of a portion of the AC charging module in accordance with an exemplary embodiment showing the AC insert.

FIG. 6 is a rear perspective view of a portion of the AC charging module 102 in accordance with an exemplary embodiment showing the AC insert 200. FIG. 7 is a cross-sectional view of a portion of the AC charging module 102 in accordance with an exemplary embodiment showing the AC insert 200.

The AC insert 200 includes AC central wall portion 230 between the front portion 224 and the rear portion 226. The AC insert 200 includes AC terminal channels 232 through the central wall portion 230. The AC terminal channels 232 are configured to receive corresponding AC terminals 202 (shown in FIG. 5). The AC insert 200 includes a front cavity 234 in the front portion 224 forward of the central wall portion 230 and a rear cavity 236 in the rear portion 226 rearward of the central wall portion 230. In an exemplary embodiment, the insert seal 212 is received in an opening in the central wall portion 230 to provide an environmental seal between the front cavity 234 and the rear cavity 236 through the central wall portion 230.

The rear cavity 236 is configured to receive the PCB assembly 206. In an exemplary embodiment, the AC insert 200 includes a circuit board latch 238 extending from the central wall portion 230 into the rear cavity 236. The circuit board latch 238 is configured to secure the circuit board 300 of the PCB assembly 206 in the rear cavity 236.

The AC terminal channels 232 extend between the front cavity 234 and the rear cavity 236. The mating ends 260 of the AC terminals 202 extend from the AC terminal channels 232 into the front cavity 234 for mating with the charging connector. In an exemplary embodiment, the AC insert 200 includes terminal latches 240 in the AC terminal channels 232. The terminal latches 240 are deflectable latches configured to engage the AC terminals 202 and retain the AC terminals 202 in the AC insert 200. For example, the terminal latches 240 are configured to engage the latching features 266 (shown in FIG. 5) of the AC terminals 202. In an exemplary embodiment, the terminal latches 240 are configured to be unlatched from the AC terminals 202 to release the AC terminals 202 from the AC terminal channels 232, such as for repair or replacement of the AC terminals 202. In an exemplary embodiment, the front cavity 234 is configured to receive the TPA device 210 (shown in FIG. 5), which is used to ensure that the terminal latches 240 are properly latched to the AC terminals 202. In an exemplary embodiment, the AC insert 200 includes device latching features 242 used to latchably secure the TPA device 210 in the front cavity 234. In the illustrated embodiment, the device latching features 242 are protrusions extending from walls of the AC insert 200 into the front cavity 234. Other types of latching features may be used in alternative embodiments.

In an exemplary embodiment, the AC insert 200 includes a seal pocket 244 at the insert rear 222. The seal pocket 244 receives the cover seal 228. A portion of the rear cover 280 (shown in FIG. 5) is received in the seal pocket 244 to interface with the cover seal 228. In the illustrated embodiment, the seal pocket 244 and the cover seal 228 extend circumferentially around the rear cavity 236 To provide a perimeter seal entirely circumferentially around the AC insert 200. In an exemplary embodiment, the AC insert 200 includes cover latches 246 configured to interface with the rear cover assembly 208 to secure the rear cover assembly 208 on the AC insert 200. For example, the cover latches 246 interface with the latching features 285 (shown in FIG. 5) of the rear cover 280 two secure the rear cover 280 on the rear portion 226 of the AC insert 200. In the illustrated embodiment, the cover latches 246 are deflectable latches. The cover latches 246 may be released to remove the rear cover 280 from the AC insert 200. In the illustrated embodiment, two cover latches 246 are provided on opposite sides of the rear portion 226. Greater or fewer cover latches 246 may be provided in alternative embodiments. Other types of latching features may be used in alternative embodiments to secure the rear cover assembly 208 to the AC insert 200.

Figure 8:
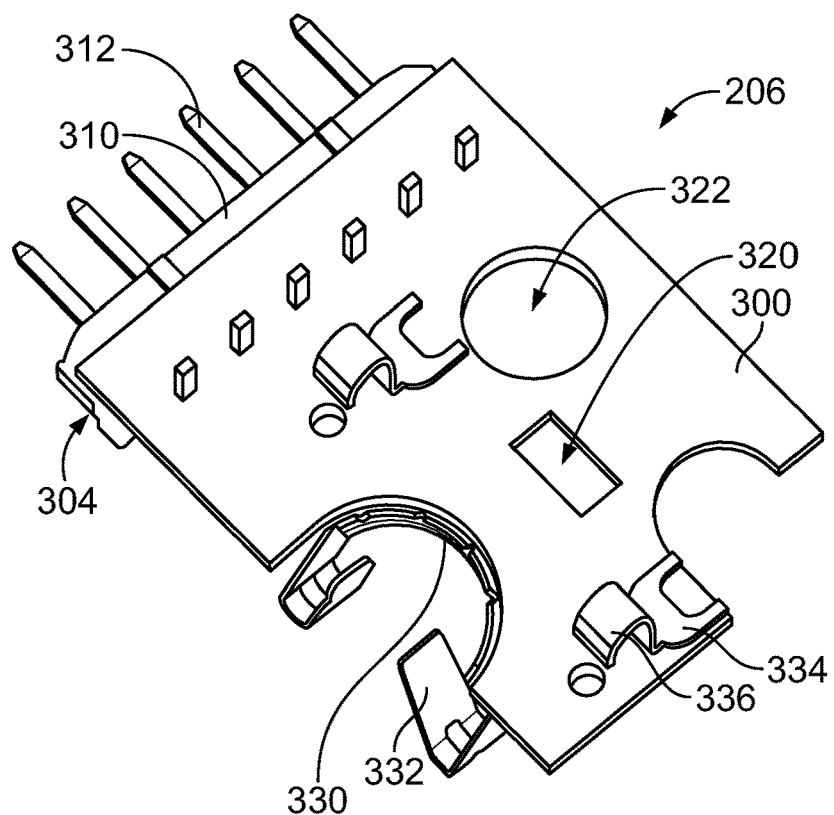
FIG. 8 is a front perspective view of a PCB assembly of the Ac AC charging module in accordance with an exemplary embodiment.
Figure 9:
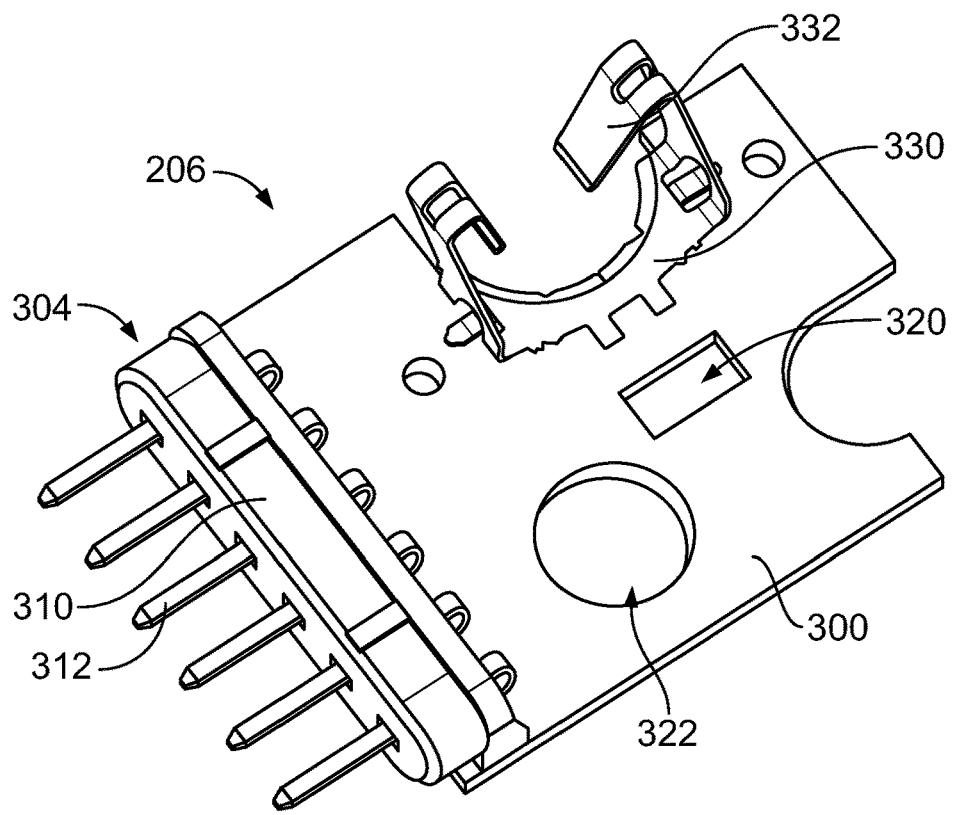
FIG. 9 is a rear perspective view of the PCB assembly in accordance with an exemplary embodiment.

FIG. 8 is a front perspective view of the PCB assembly 206 in accordance with an exemplary embodiment. FIG. 9 is a rear perspective view of the PCB assembly 206 in accordance with an exemplary embodiment. The PCB assembly 206 includes the circuit board 300 and the low-voltage connector 304 mounted to the circuit board 300.

In the illustrated embodiment, the low-voltage connector 304 includes a connector body 310 holding a plurality of contacts 312. The contacts 312 may be pin contacts; however, other types of contacts may be used in alternative embodiments, such as socket contacts. The contacts 312 extend from the connector body 310 for mating with the low-voltage mating connector 136 (shown in FIG. 3). In an exemplary embodiment, the connector body 310 is sized and shaped to fit in the low-voltage connector shroud 306 (shown in FIG. 5) of the AC insert 200.

In an exemplary embodiment, the circuit board 300 includes a latch opening 320 configured to receive the circuit board latch 238 (shown in FIGS. 6 and 7). In alternative embodiments, the circuit board latch(s) 238 may engage the outer edges of the circuit board 300 rather than being received in the latch opening 320. Other types of securing features may be used in alternative embodiments. In an exemplary embodiment, the circuit board 300 includes terminal openings 322. The terminal openings 322 receive the AC terminals 202 (shown in FIG. 5). The terminal openings 320 to allow the AC terminals 202 to pass through the circuit board 300.

In an exemplary embodiment, the PCB assembly 206 includes a ground circuit board contact 330 electrically connected to the circuit board 300 and configured to interface with the ground terminal 254 (shown in FIG. 5) of the AC terminals 202. For example, the ground circuit board contact 330 may include mating beams 332 configured to engage the ground terminal 254. In the illustrated embodiment, the ground circuit board contact 330 is provided at a top of the circuit board 300 at the terminal opening 322 that receives the ground terminal 254. Other locations are possible in alternative embodiments. The ground circuit board contact 330 creates an electrical connection between the ground terminal 254 and the circuit board 300. Other types of electrical connections may be made between the ground terminal 254 and the circuit board 300. For example, the ground terminal 254 may be soldered directly to a pad or via of the circuit board 300.

In an exemplary embodiment, the PCB assembly 206 includes low-voltage circuit board contacts 334 electrically connected to the circuit board 300 and configured to interface with the low-voltage contacts 302 (shown in FIG. 5). For example, the low-voltage circuit board contacts 334 include mating beams 336 configured to engage the low-voltage contacts 302. In the illustrated embodiment, the low-voltage circuit board contacts 334 are provided on a bottom of the circuit board 300. Other locations are possible in alternative embodiments. The low-voltage circuit board contacts 334 create electrical connections between the low-voltage contacts 302 and the circuit board 300. Other types of electrical connections may be made between the low-voltage contacts 302 and the circuit board 300. For example, the low-voltage contacts 302 may be soldered directly to pads or vias of the circuit board 300.

Figure 10:
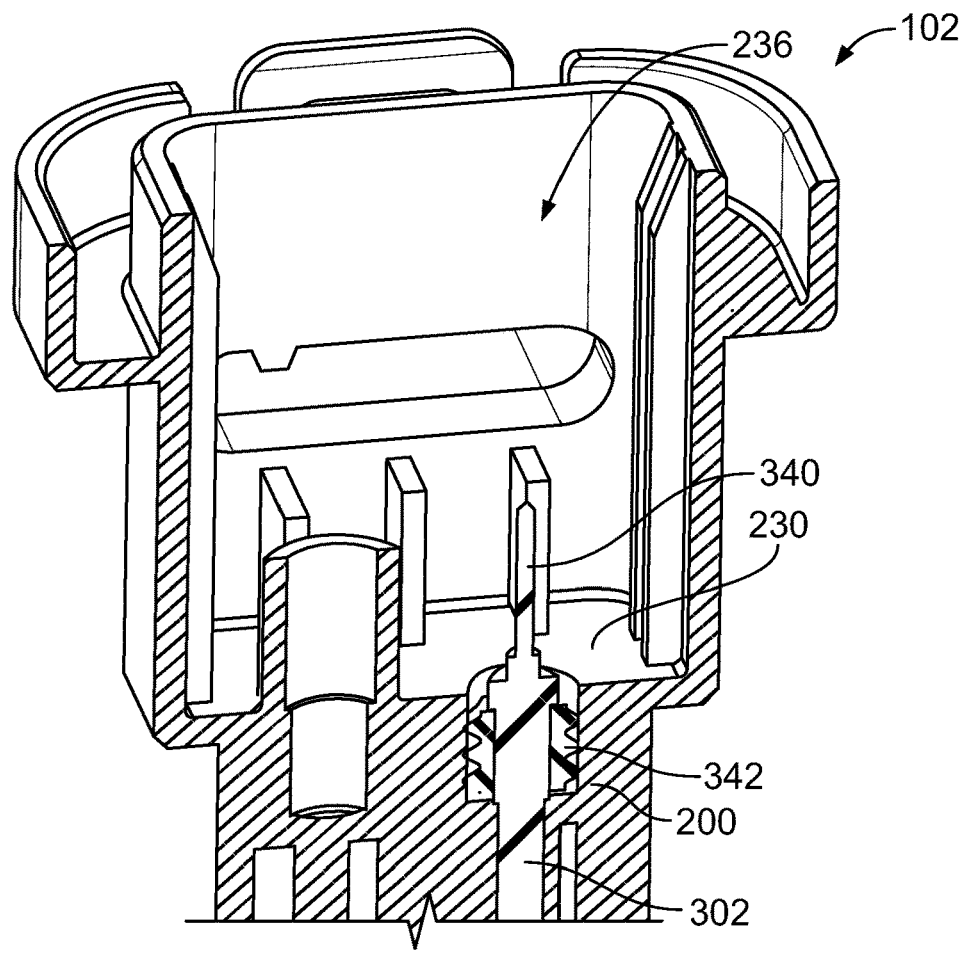
FIG. 10 is a cross-sectional view of a portion of the AC charging module showing a low-voltage contact in the AC insert in accordance with an exemplary embodiment.

FIG. 10 is a cross-sectional view of a portion of the AC charging module 102 showing one of the low-voltage contacts 302 in the AC insert 200. The low-voltage contact 302 is received in a corresponding terminal channel of the center wall portion 230. A terminating end 340 of the low-voltage contact 302 extends into the rear cavity 236, such as for interfacing with the PCB assembly 206 (shown in FIG. 8). In an exemplary embodiment, the low-voltage contact 302 includes a contact seal 342 surrounding a body of the low-voltage contact 302. The contact seal 342 is configured to be sealed to the AC insert 200 to prevent leakage through the terminal channel in the center wall portion 230.

Figure 11:
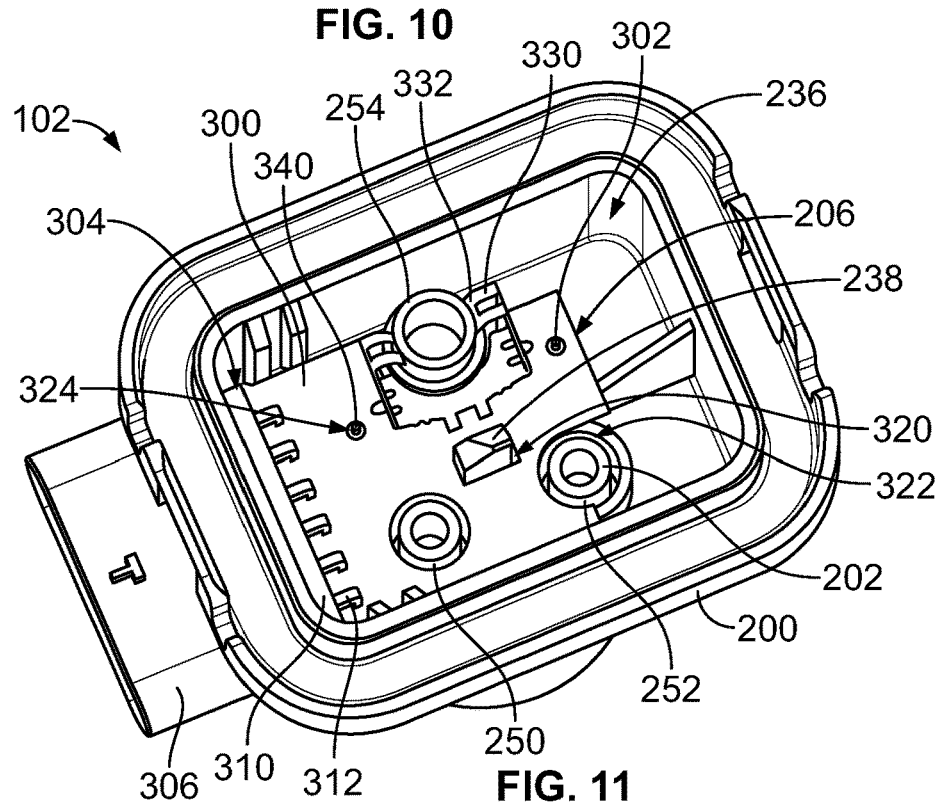
FIG. 11 is a rear view of a portion of the AC charging module showing the PCB assembly received in the AC insert in accordance with an exemplary embodiment.
Figure 12:
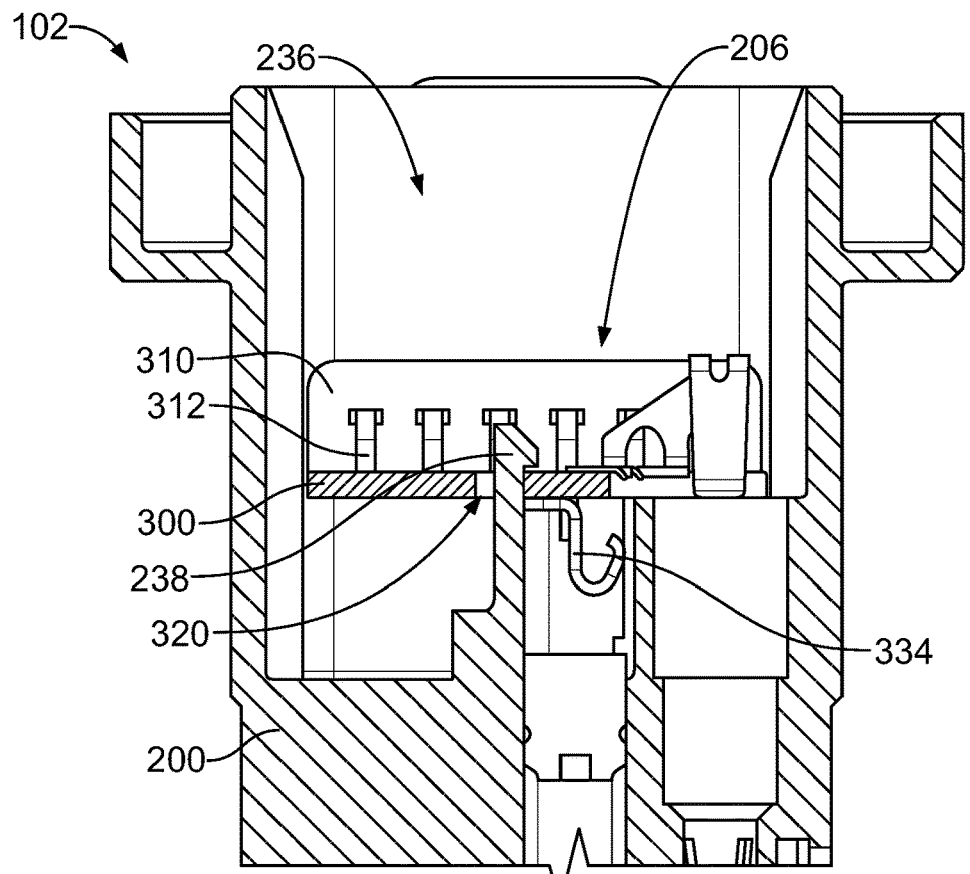
FIG. 12 is a cross-sectional view of a portion of the AC charging module showing the PCB assembly received in the AC insert in accordance with an exemplary embodiment.
Figure 13:
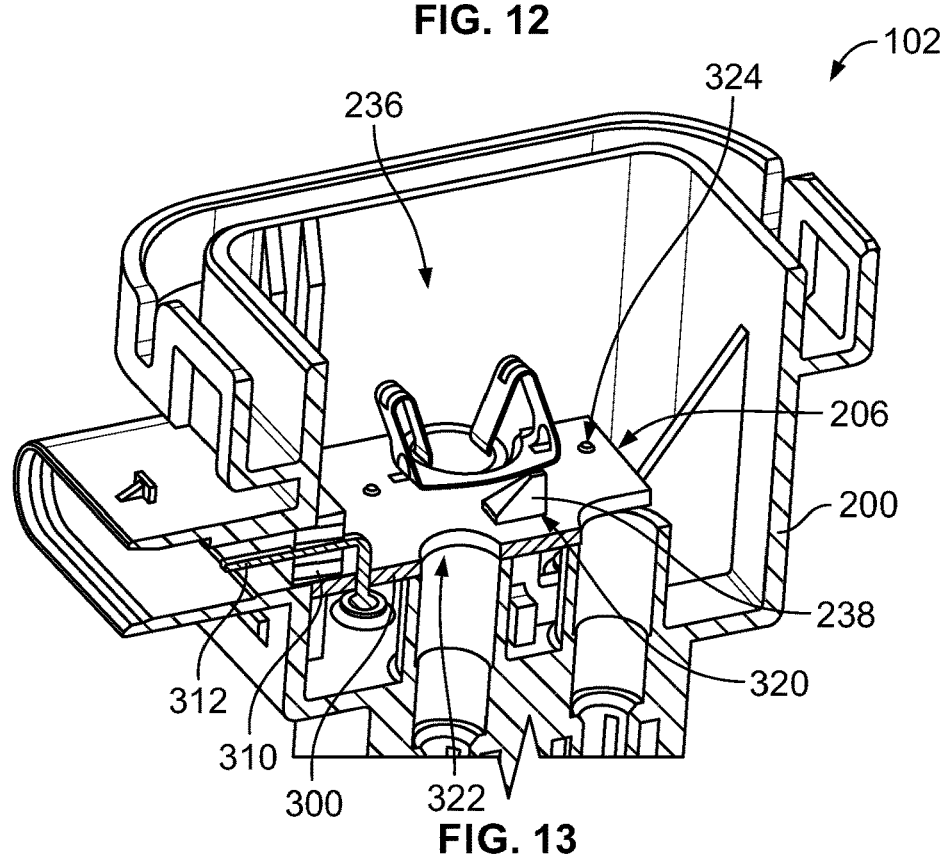
FIG. 13 is a partial sectional view of a portion of the AC charging module showing the PCB assembly received in the AC insert in accordance with an exemplary embodiment.

FIG. 11 is a rear view of a portion of the AC charging module 102 showing the PCB assembly 206 received in the AC insert 200. FIG. 12 is a cross-sectional view of a portion of the AC charging module 102 showing the PCB assembly 206 received in the AC insert 200. FIG. 13 is a partial sectional view of a portion of the AC charging module 102 showing the PCB assembly 206 received in the AC insert 200. FIG. 11 illustrates the AC terminals 202 and the low-voltage contacts 302 positioned relative to the AC insert 200 and the PCB assembly 206. FIGS. 12 and 13 have the AC terminals 202 and the low-voltage contacts 302 removed for clarity.

When assembled, the circuit board latch 238 is received in the latch opening 320 and coupled to the circuit board 300 to retain the PCB assembly 206 in the rear cavity 236. The PCB assembly 206 is positioned in the AC insert 200 such that the connector body 310 of the low-voltage connector 304 is aligned with, and at least partially received in, the low-voltage connector shroud 306 of the AC insert 200. The low-voltage mating connector 136 (shown in FIG. 3) may be coupled to the low-voltage connector shroud 306 to mate with the low-voltage connector 304. The contacts 312 of the low-voltage connector 304 are electrically connected to the low-voltage contacts 302 through the circuit board 300 to transmit data signals between the low-voltage contacts 302 and the low-voltage mating connector 136.

When assembled, the ground terminal 254 (FIG. 11) is positioned to interface with the ground circuit board contact 330 of the PCB assembly 206. For example, the mating beams 332 engage and are electrically connected to the ground terminal 254. When assembled, the line terminal 250 and the neutral terminal 252 are aligned with corresponding terminal openings 322 in the circuit board 300. As such the terminals 250, 252 and/or the AC cables 204 (shown in FIG. 5) may pass through the circuit board 300.

In an exemplary embodiment, the circuit board 300 includes contact openings 324 that receive ends of the low-voltage contacts 302. The contact openings 324 may be aligned with the low-voltage circuit board contacts 334 (FIG. 12), which mate with the terminating ends 340 of the low-voltage contacts 302. In an exemplary embodiment, the low-voltage contacts 302 include a pilot contact and a proximity contact configured to be mated with the charging connector. The proximity contact is used for pre-insertion signaling, such as for signaling when/if the charging connector is present and coupled to the AC charging module 102. The pilot contact is used for post insertion signaling, such as for signaling presence of safety ground connection, for signaling current capacity, or for other charging signaling.

Figure 14:
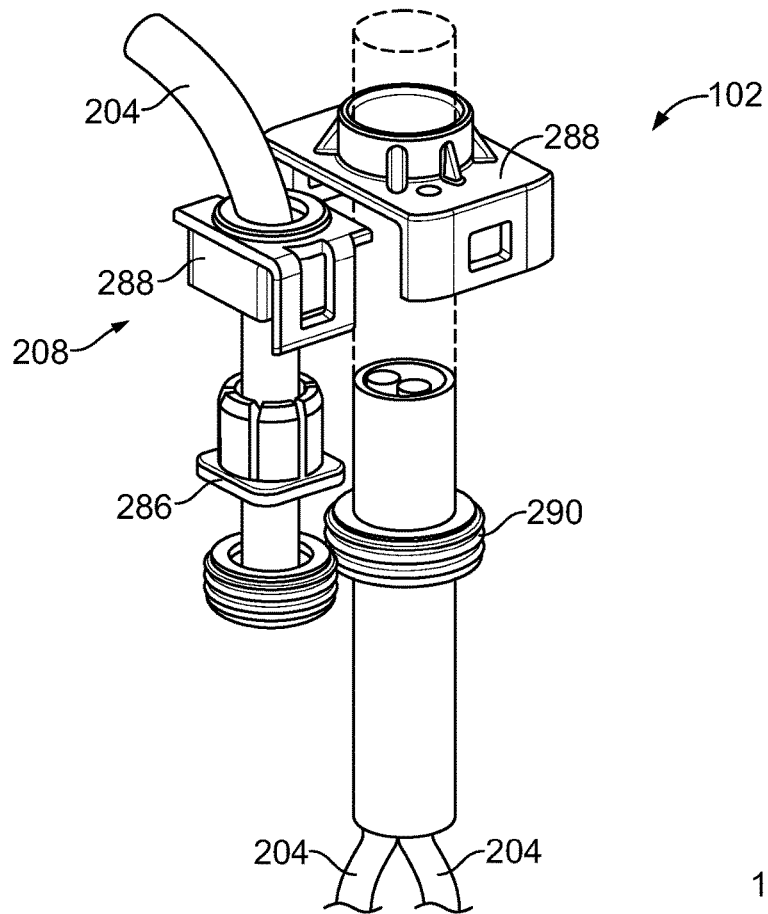
FIG. 14 is a perspective view of a portion of the AC charging module showing a portion of the rear cover assembly partially assembled with the AC cables in accordance with an exemplary embodiment.
Figure 15:
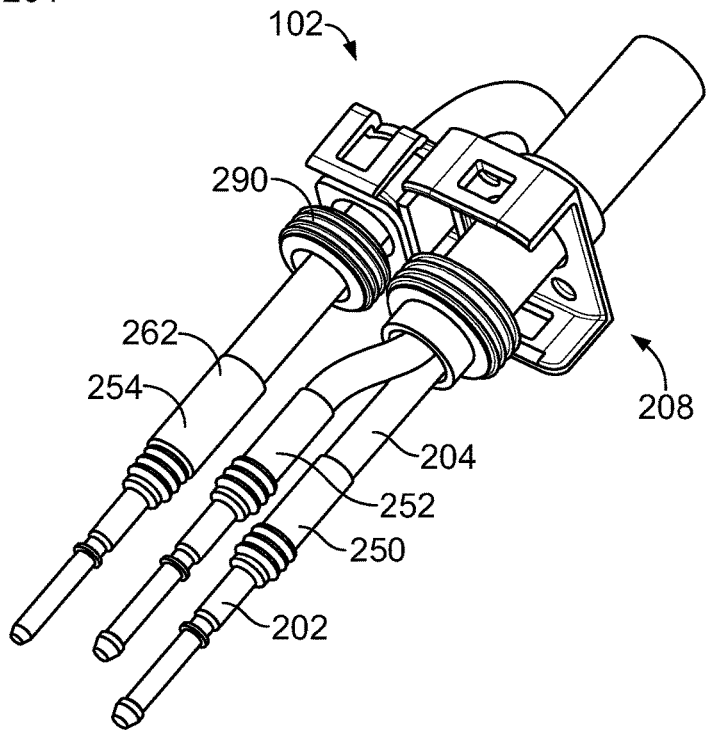
FIG. 15 is a perspective view of a portion of the AC charging module showing a portion of the rear cover assembly partially assembled with the AC cables and the AC terminals in accordance with an exemplary embodiment.

FIG. 14 is a perspective view of a portion of the AC charging module 102 showing a portion of the rear cover assembly 208 partially assembled with the AC cables 204. FIG. 15 is a perspective view of a portion of the AC charging module 102 showing a portion of the rear cover assembly 208 partially assembled with the AC cables 204 and the AC terminals 202.

During assembly, the strain relief members 286 and the cable covers 288 are loaded onto ends of the AC cables 204.

The cable seals 290 are loaded onto the ends of the AC cables 204. Ends of the AC cables 204 may be stripped and terminated to the cable ends 262 of the AC terminals 202. In an exemplary embodiment, the line cable and the neutral cable terminated to the line terminal 250 and the neutral terminal 252 are bundled together and received in a common cable jacket, which is received in a single cable seal 290 and cable cover 288. In the illustrated embodiment, the ground cable terminated to the ground terminal 254 is separate from the cable bundle of the line cable and the neutral cable. The ground cable is received in a separate cable seal 290 and cable cover 288. However, in alternative embodiments, three separate cables, cable seals and cable covers may be provided. In other alternative embodiments, the ground cable may be bundled with the line cable and the neutral cable in a single cable jacket. In the illustrated embodiment, only the ground cable includes the strain relief member 286. Alternatively, both of the cables may have corresponding strain relief members 286.

Figure 16:
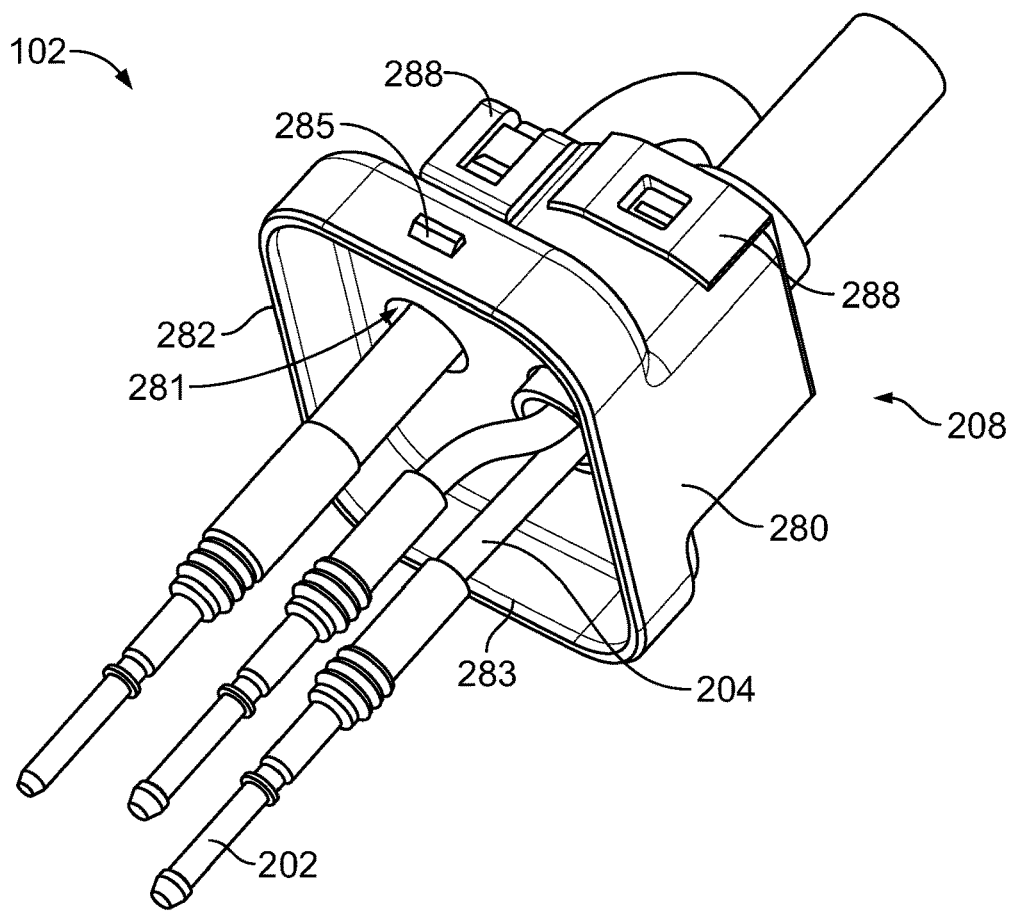
FIG. 16 is a perspective view of a portion of the AC charging module showing the rear cover assembly in an assembled state with the AC cables and the AC terminals passing through the rear cover assembly in accordance with an exemplary embodiment.

FIG. 16 is a perspective view of a portion of the AC charging module 102 showing the rear cover assembly 208 in an assembled state with the AC cables 204 and the AC terminals 202 passing through the rear cover assembly 208. The cables 204 pass through cable channels 281 in the rear cover 280. When assembled, the cable seals 290 are located in the cable channels 281 and sealed to the rear cover 280 within the cable channels 281. The cable covers 288 are coupled to the rear cover 280, such as using latching features. The cable covers 288 retain the cable seals 290 and the cable channels 281. The cable covers 288 and/or the strain relief members 286 provides strain relief for the AC cables 204 at the cable exit points from the rear cover 280. In an exemplary embodiment, the rear cover 280 includes a rim 283 surrounding a perimeter of the rear cover 280 at the front 282. The latching features 285 may extend outward from the rim 283.

Figure 17:
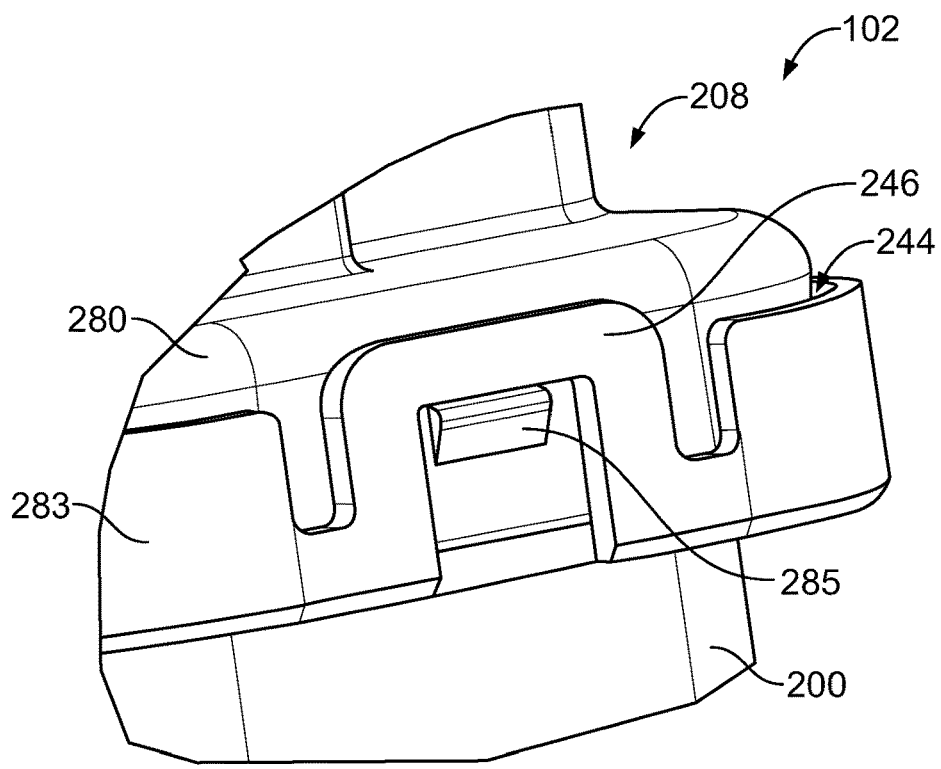
FIG. 17 is a perspective view of a portion of the AC charging module showing the rear cover assembly coupled to the AC insert in accordance with an exemplary embodiment.

FIG. 17 is a perspective view of a portion of the AC charging module 102 showing the rear cover assembly 208 coupled to the AC insert 200. When assembled, the rim 283 is received in the seal pocket 244 to interface with the cover seal 228 (shown in FIGS. 6 and 7) to form a sealed interface between the rear cover 280 and the AC insert 200. When the rear cover 280 is coupled to the AC insert 200, the latching feature 285 of the rear cover 280 interfaces with the cover latch 246 of the AC insert 200. The cover latch 246 retains the rear cover 280 in the seal pocket 244. The cover latch 246 is releasable to allow removal of the rear cover 280.

Figure 18:
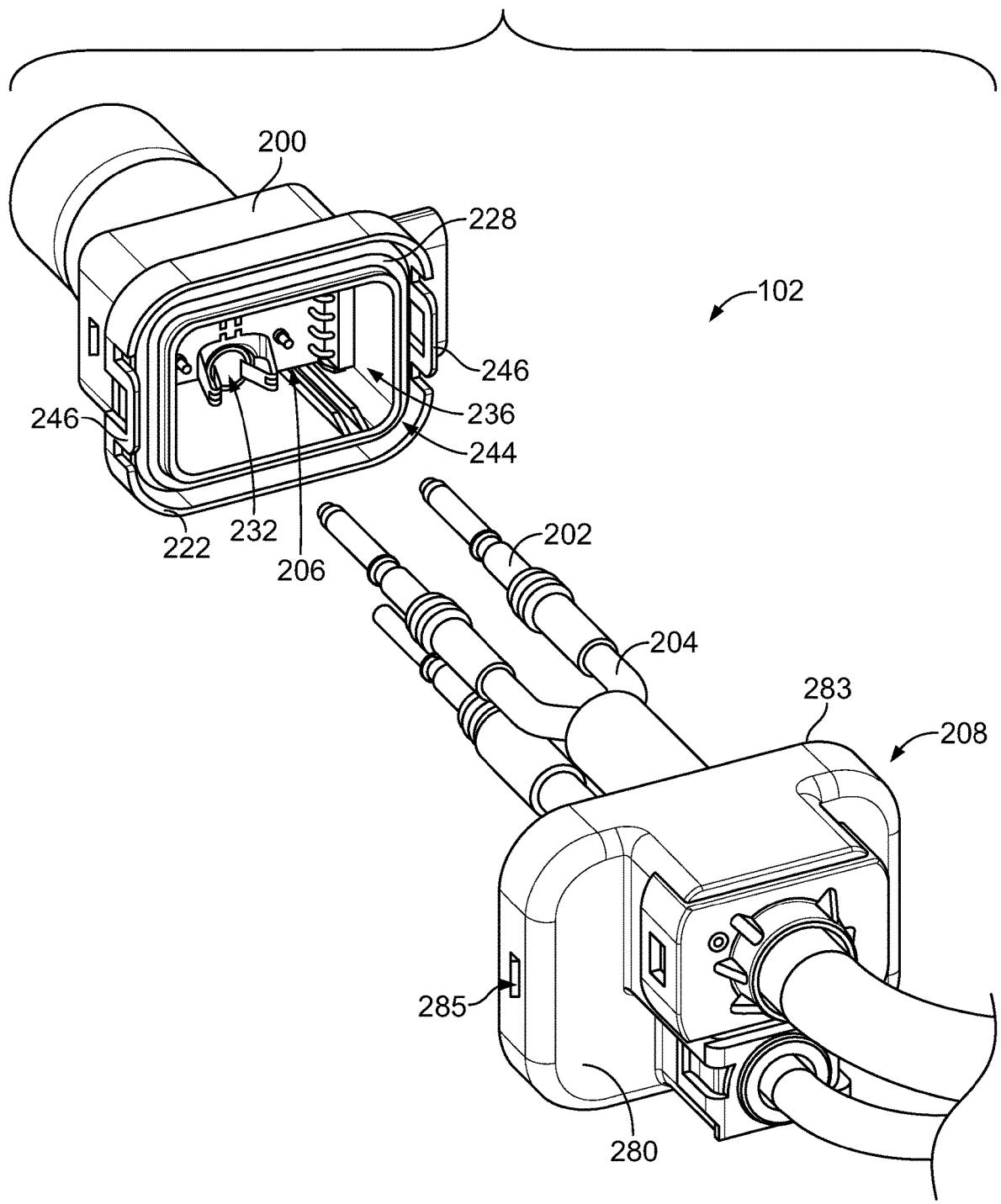
FIG. 18 is an exploded view of the AC charging module in accordance with an exemplary embodiment.

FIG. 18 is an exploded view of the AC charging module 102 in accordance with an exemplary embodiment. During assembly, after the AC terminals 202 are terminated to the AC cables 204 and the rear cover assembly 208 is coupled to the AC cables 204, the subassembly may be loaded into the AC insert 200. The PCB assembly 206 may be pre-assembled in the AC insert 200 to receive the AC terminals 202. The AC terminals 202 are plugged into the AC insert 200, such as into the AC terminal channels 232. The AC cables 204 are configured be received in the rear cavity 236 and extend out through the rear cover assembly 208. The rear cover assembly 208 is configured to be coupled to the insert rear 222 of the AC insert 200. For example, the rim 283 of the rear cover 280 is received in the seal pocket 244 of the AC insert 200 to engage the cover seal 228. The latching features 285 are configured to interface with the cover latches 246 to secure the rear cover assembly 208 to the AC insert 200.

Figure 19:
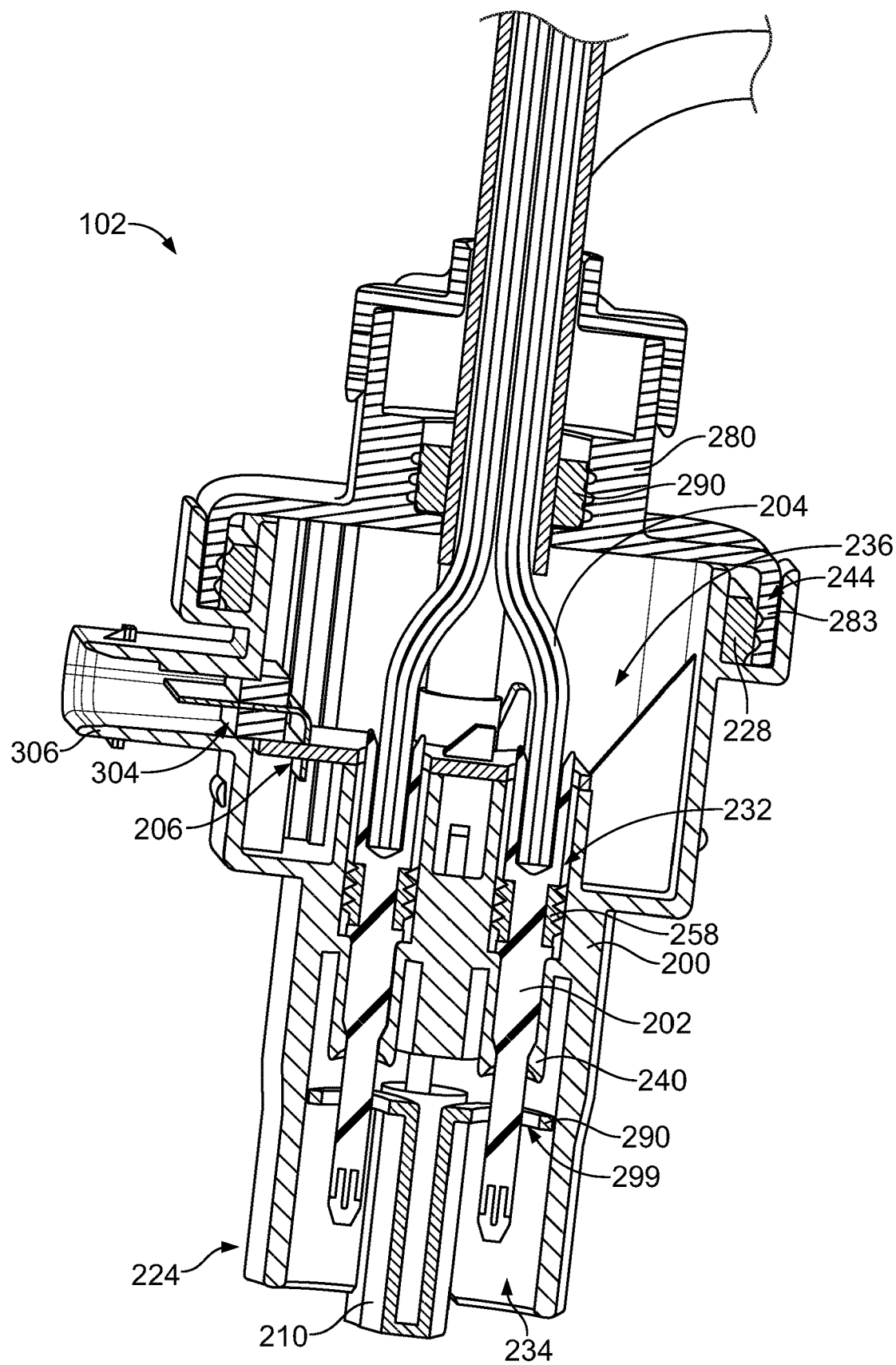
FIG. 19 is a cross-sectional view of the AC charging module in accordance with an exemplary embodiment.

FIG. 19 is a cross-sectional view of the AC charging module 102 in accordance with an exemplary embodiment. When assembled, the PCB assembly 206 is located in the rear cavity 236 and the LV connector 304 is received in the LV connector shroud 306. The LV connector 304 may interface with the LV connector shroud to create a sealed interface. The AC cables 204 extend through the rear cover 280 into the rear cavity 236 to the AC terminals 202. The cable seals 290 provide a sealed interface between the AC cable 204 and the rear cover 280. The AC terminals 202 are loaded into the AC terminal channels 232 and extend into the front cavity 234 to mate with the charging connector. The terminal seals 258 provide a sealed interface between the AC terminals 202 and the AC insert 200. When assembled, the rim 283 of the rear cover 280 is received in the seal pocket 244 of the AC insert 200 to engage the cover seal 228 and create a sealed interface.

In the illustrated embodiment, the TPA device 210 is provided at the front portion 224 of the AC insert 200. The TPA device 210 is shown in an extended position. The TPA device 210 does not represent position assurance in the extended position. In the extended position, the plate 298 is located forward of the terminal latches 240, and thus does not interface with the terminal latches 240. The TPA device 210 may be moved to an assurance position by pushing the TPA device 210 rearward into the AC insert 200. In the assurance position, the plate 298 is aligned with and interfaces with the terminal latches 240. The plate 298 includes openings 299 that receive the terminal latches 240 when the TPA device 210 is moved to the assurance position. The plate 298 is unable to move to the assurance position when the terminal latches 240 are deflected, such as to unlatched positions. For example, distal ends of the terminal latches 240 interfere with the plate 298 and block the TPA device 210 from moving rearward/inward into the AC insert 200. When the TPA device 210 is able to move to the assurance position, the installer is assured that the terminal latches 240 are in the latched positions and thus retaining the AC terminals 202 in the terminal channels 232. In the assurance position, the plate 298 provides back-up for the terminal latches 240 to restrict unlatching of the terminals latches 240 from the AC terminals 202. In an exemplary embodiment, the TPA device 210 may restrict mating with the charging connector in the extended position. For example, the charging connector is unable to mate or unable to fully mate with the AC charging module in the extended position.

Figure 20:
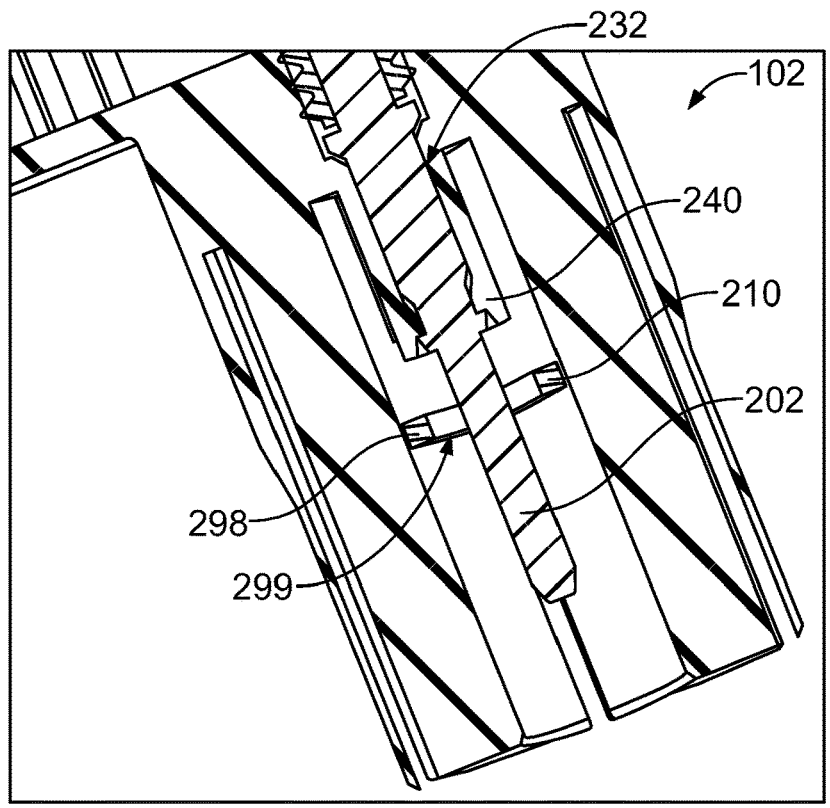
FIG. 20 is a cross-sectional view of a portion of the AC charging module showing the TPA device in the extended position in accordance with an exemplary embodiment.
Figure 21:
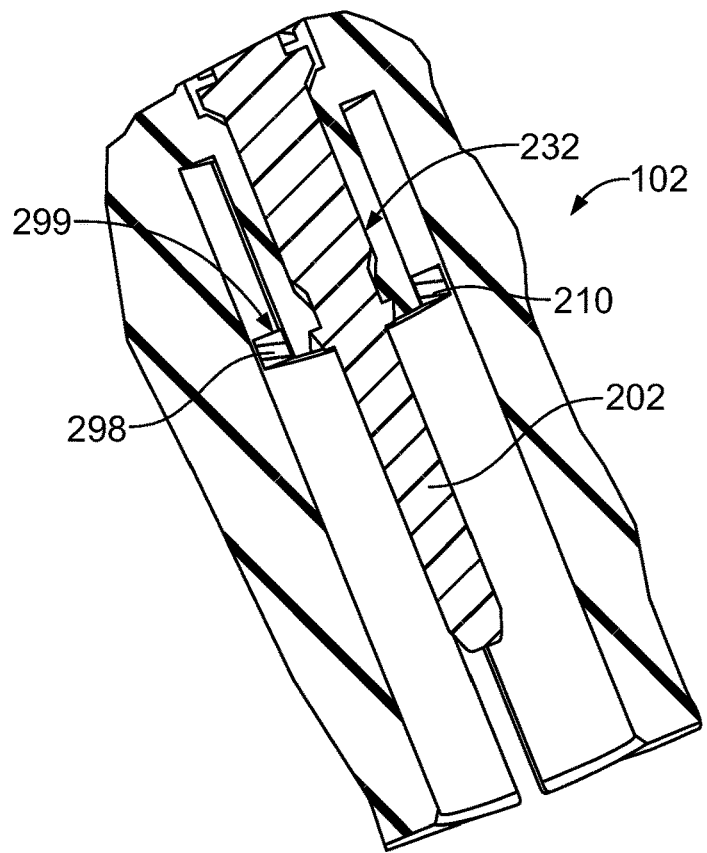
FIG. 21 is a cross-sectional view of a portion of the AC charging module showing the TPA device in the assurance position in accordance with an exemplary embodiment.

FIG. 20 is a cross-sectional view of a portion of the AC charging module 102 showing the TPA device 210 in the extended position. FIG. 21 is a cross-sectional view of a portion of the AC charging module 102 showing the TPA device 210 in the assurance position. FIGS. 20 and 21 illustrates the plate 298 of the TPA device 210. The AC terminal 202 passes through the opening 299 in the plate 298.

In the extended position (FIG. 20), the plate 298 is located forward of the terminal latches 240. In the assurance position (FIG. 21), the plate 298 is aligned with and interfaces with the terminal latches 240. In the assurance position, the plate 298 provides back-up for the terminal latches 240 to restrict unlatching of the terminals latches 240 from the AC terminals 202. In the assurance position, the installer is assured that the terminal latches 240 are in the latched positions and thus retaining the AC terminals 202 in the terminal channels 232.

Figure 22:
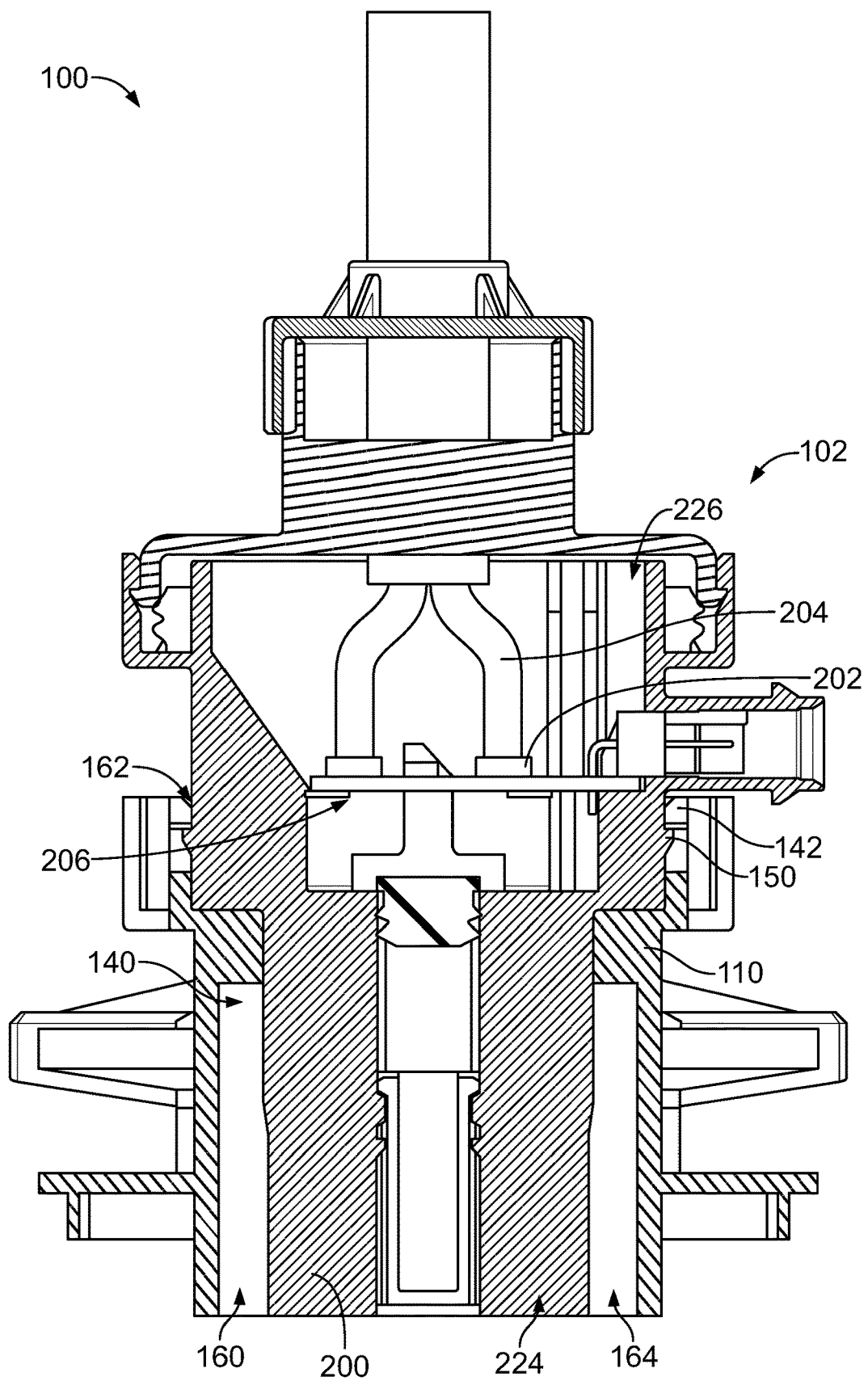
FIG. 22 is a cross-sectional view of the charging inlet assembly illustrating the AC charging module in the housing in accordance with an exemplary embodiment.

FIG. 22 is a cross-sectional view of the charging inlet assembly 100 illustrating the AC charging module 102 in the housing 110. The AC charging module 102 is received in the AC module chamber 140 such that the front portion 224 of the AC insert 200 is located in a front chamber 160 of the housing 110 and the rear portion 226 of the AC insert 200 is located in a rear chamber 162 of the housing 110. A pocket 164 is formed around the front portion 224 that receives a portion of the charging connector.

When assembled, the AC insert 200 is latchably coupled to the housing 110. The latching features 150 are latchably coupled to the latching features 142. The AC charging module 102 is removable from the housing 110 to separate the components of the AC charging module 102 (for example, AC terminals 202, AC cables 204, PCB assembly 206, and the like) from the housing 110, such as for repair and/or replacement of the AC charging module components or repair or replacement of other components of the charging inlet assembly 100, such as the DC charging components or the housing 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly comprising:
   a housing extending between a front and a rear, the housing having a DC section including DC terminal channels configured to receive DC terminals, the housing having an AC section including an AC module chamber, the DC section configured for mating with a DC charging connector at the front, the AC section configured for mating with an AC charging connector at the front; and
   an AC charging module removably received in the AC module chamber, the AC charging module including an AC insert extending between an insert front and an insert rear, the AC insert including AC terminal channels between the insert front and the insert rear, the AC charging module including AC terminals received in the AC terminal channels, the AC terminals being terminated to ends of AC cables extending from the insert rear, wherein the AC insert includes a rear cavity rearward of the AC terminal channels, the AC charging module including a PCB assembly in the rear cavity;
   wherein the AC terminals and the AC cables are removable from the housing with the AC insert.

2. The charging inlet assembly of claim 1, wherein the AC charging module is removable from the housing separate from the DC terminals.

3. The charging inlet assembly of claim 1, wherein the housing includes a latching feature, the AC insert including an insert latching feature latchably engaging the latching feature of the housing to secure the AC insert in the housing, the latching feature and the insert latching feature being separable to allow removal of the AC charging module from the housing.

4. The charging inlet assembly of claim 1, wherein the AC insert is separable from the rear of the housing to physically separate the AC terminals and the AC cables form the housing as a unit.

5. The charging inlet assembly of claim 1, wherein the AC insert is manufactured from a dielectric material, the AC terminal channels being separated from each other by the dielectric material of the AC insert.

6. The charging inlet assembly of claim 1, wherein the PCB assembly includes a low-voltage contact having a mating end and a terminating end, the mating end extending toward the insert front for mating with a low-voltage contact of the charging connector, the terminating end being terminated to a circuit board of the PCB assembly.

7. The charging inlet assembly of claim 1, wherein the PCB assembly includes a low-voltage connector, the AC insert including a low-voltage connector shroud configured for mating with a low-voltage mating connector, the low-voltage connector being aligned with the low-voltage connector shroud for mating with the low-voltage mating connector.

8. The charging inlet assembly of claim 1, wherein the AC terminals include a first terminal, a second terminal and a ground terminal, and wherein the AC cables include a first AC cable, a second AC cable, and a ground cable, the first terminal terminated to the first AC cable, the second terminal terminated to the second AC cable, the ground terminal terminated to the ground cable.

9. The charging inlet assembly of claim 1, further comprising a cover seal coupled to the AC insert at the insert rear and a rear cover assembly coupled to the insert rear of the AC insert, the rear cover assembly engaging the cover seal to form a sealed interface between the AC insert and the rear cover assembly.

10. The charging inlet assembly of claim 1, further comprising a rear cover assembly, the rear cover assembly including a rear cover coupled to the insert rear, the rear cover having at least one cable exit port, the rear cover assembly including cable seals coupled to the rear cover and coupled to corresponding AC cables to seal between the AC cables and the rear cover, the rear cover assembly being removable from the housing with the AC insert.

11. The charging inlet assembly of claim 1, wherein the AC charging module includes a terminal position assurance device coupled to the AC insert at the insert front, the AC insert including terminal latches in the AC terminal channels latchably secured to the AC terminals to secure the AC terminals in the AC terminal channels, the terminal position assurance device interfacing with the terminal latches to provide terminal position assurance.

12. A charging inlet assembly comprising:
    a housing extending between a front and a rear, the housing having a DC section including DC terminal channels configured to receive DC terminals, the housing having an AC section including an AC module chamber, the housing including a latching feature at the AC section, the DC section configured for mating with a DC charging connector at the front, the AC section configured for mating with an AC charging connector at the front;

an AC charging module removably received in the AC module chamber, the AC charging module including an AC insert extending between an insert front and an insert rear, the AC insert including an insert latching feature latchably coupled to the latching feature of the housing to secure the AC insert in the housing, the AC insert including a rear cavity at the insert rear, the AC insert including AC terminal channels extending forward from the rear cavity to the insert front, the AC charging module including AC terminals, each AC terminal extending between a mating end and a cable end, the mating end received in the corresponding AC terminal channel, the cable end being terminated to an end of a corresponding AC cable, the AC charging module including a rear cover assembly coupled to the insert rear, the AC cables extending through the rear cover assembly; and a rear cover assembly coupled to the insert rear of the AC insert, the rear cover assembly including a cover seal to form a sealed interface between the AC insert and the rear cover assembly;

wherein the AC terminals and the AC cables are removable from the housing with the AC insert.

13. The charging inlet assembly of claim 12, wherein the AC insert is separable from the rear of the housing to physically separate the AC terminals and the AC cables form the housing as a unit.

14. The charging inlet assembly of claim 12, wherein the AC insert includes a rear cavity rearward of the AC terminal channels, the AC charging module including a PCB assembly in the rear cavity, the PCB assembly includes a low-voltage contact configured to be mated with a low-voltage contact of the charging connector, the PCB assembly including a low-voltage connector electrically connected to the low-voltage contact.

15. The charging inlet assembly of claim 12, wherein the rear cover assembly including cable seals coupled to the AC cables, the rear cover assembly being removable from the housing with the AC insert.

16. The charging inlet assembly of claim 12, wherein the AC charging module includes a terminal position assurance device coupled to the AC insert at the insert front, the AC insert including terminal latches in the AC terminal channels latchably secured to the AC terminals to secure the AC terminals in the AC terminal channels, the terminal position assurance device interfacing with the terminal latches to provide terminal position assurance.

17. An AC charging module comprising:

an AC insert extending between an insert front and an insert rear, the AC insert including an insert latching feature configured to be latchably coupled to a latching feature of a charging inlet housing to secure the AC insert in the charging inlet housing, the AC insert including a rear cavity at the insert rear, the AC insert including AC terminal channels extending forward from the rear cavity to the insert front;

AC terminals received in corresponding AC terminal channels, each AC terminal extending between a mating end and a cable end, the AC terminal including a mating pin at the mating end, the mating pin received in the corresponding AC terminal channel for mating with an AC charging contact of an AC charging connector, the cable end being terminated to an end of an AC cable, the AC terminal including a terminal seal received in the AC terminal channel to seal between the AC terminal and the AC insert;

a PCB assembly received in the rear cavity, the PCB assembly including a circuit board, the PCB assembly including a low-voltage contact coupled to the circuit board and extending through the insert housing for mating with a low-voltage contact of the AC charging connector;

a rear cover assembly coupled to the insert rear of the AC insert, the rear cover assembly closing the PCB assembly and the AC terminals in the AC insert, the AC cables extending through the rear cover assembly;

wherein the AC terminals and the AC cables are configured to be removed from the charging inlet housing with the AC insert.

18. The AC charging module of claim 17, further comprising a cover seal coupled to the insert rear and the rear cover assembly to form a sealed interface between the AC insert and the rear cover assembly, the rear cover assembly including cable seals coupled to the AC cables, the rear cover assembly being removable from the housing with the AC insert.

19. The AC charging module of claim 17, wherein the AC charging module includes a terminal position assurance device coupled to the AC insert at the insert front, the AC insert including terminal latches in the AC terminal channels latchably secured to the AC terminals to secure the AC terminals in the AC terminal channels, the terminal position assurance device interfacing with the terminal latches to provide terminal position assurance.

* * * * *